US011556275B2

(12) United States Patent
Colella et al.

(10) Patent No.: US 11,556,275 B2
(45) Date of Patent: Jan. 17, 2023

(54) TECHNIQUES FOR PAGE LINE FILLER DATA

(71) Applicant: Micron Technology, Inc., Boise, ID (US)

(72) Inventors: Nicola Colella, Capodrise (IT); Antonino Pollio, Vico Equense (IT); Gianfranco Ferrante, San Giorgio a Cremano (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/323,974

(22) Filed: May 18, 2021

(65) Prior Publication Data

US 2022/0374163 A1 Nov. 24, 2022

(51) Int. Cl.
*G06F 3/06* (2006.01)
*G06F 12/02* (2006.01)

(52) U.S. Cl.
CPC .......... *G06F 3/0656* (2013.01); *G06F 3/0604* (2013.01); *G06F 3/0676* (2013.01); *G06F 3/0679* (2013.01); *G06F 12/0253* (2013.01)

(58) Field of Classification Search
CPC .... G06F 3/0656; G06F 3/0604; G06F 3/0679; G06F 3/0676; G06F 12/0253–0276; G06F 12/0246
See application file for complete search history.

(56) References Cited

U.S. PATENT DOCUMENTS 8,996,796 B1* 3/2015 Karamcheti ........ G06F 12/0646
711/159
9,436,595 B1* 9/2016 Benitez ............... G06F 12/0246
2013/0282955 A1* 10/2013 Parker ................. G06F 12/0246
711/E12.008

OTHER PUBLICATIONS

Q. Zhang, X. Li, L. Wang, T. Zhang, Y. Wang and Z. Shao, "Optimizing deterministic garbage collection in NAND flash storage systems," 21st IEEE Real-Time and Embedded Technology and Applications Symposium, 2015, pp. 14-23, doi: 10.1109/RTAS. 2015.7108392. (Year: 2015).*
Y. Feng, D. Feng, W. Tong, J. Liu and S. Li, "Multiple Subpage Writing FTL in MLC by Exploiting Dual Mode Operations," in IEEE Transactions on Computer-Aided Design of Integrated Circuits and Systems, vol. 39, No. 3, pp. 599-612, Mar. 2020, doi: 10.1109/TCAD.2018.2890689. (Year: 2020).*

* cited by examiner

*Primary Examiner* — Khoa D Doan
(74) *Attorney, Agent, or Firm* — Holland & Hart LLP

(57) ABSTRACT

Methods, systems, and devices for using page line filler data are described. In some examples, a memory system may store data within a write buffer of the memory system. The memory system may initiate an operation to transfer the write buffer data to a memory device, for example, due to a command to perform a memory management operation (e.g., cache synchronization, context switching, or the like) from a host system. In some examples, a quantity of write buffer data may fail to satisfy a data size threshold. Thus, the memory system may aggregate the data in the write buffer with valid data from a block of the memory device associated with garbage collection. The memory system may aggregate the write buffer data with the garbage collection data until the aggregated data satisfies the data size threshold. The memory system may then write the aggregated data to the memory device.

25 Claims, 6 Drawing Sheets

TECHNIQUES FOR PAGE LINE FILLER DATA

FIELD OF TECHNOLOGY

The following relates generally to one or more systems and more specifically to techniques for page line filler data.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not—or (NOR) and not—and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
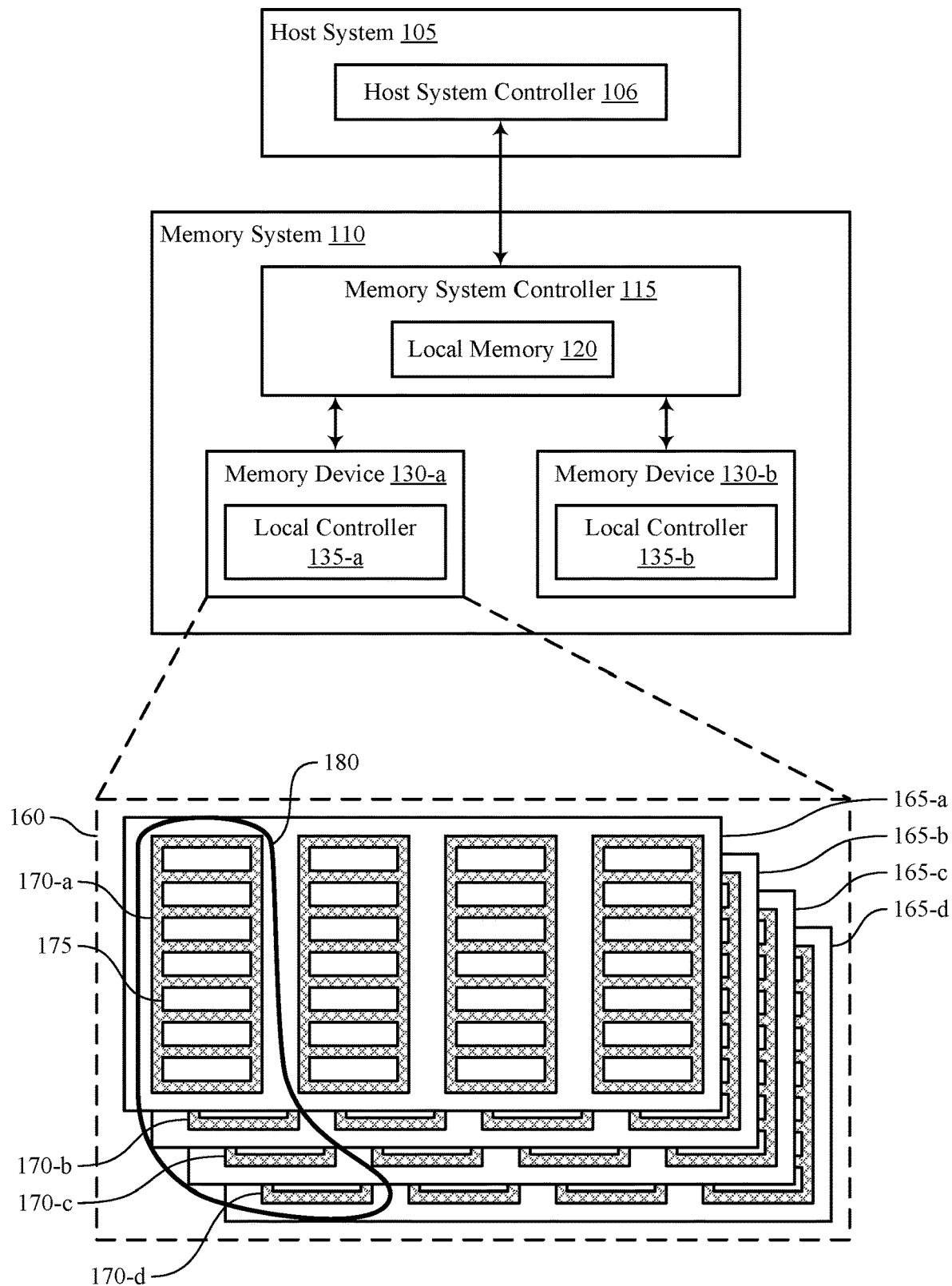
FIG. 1 illustrates an example of a system that supports techniques for page line filler data in accordance with examples as disclosed herein.

A host system may send one or more write commands to a memory system. The write commands may request the memory system to write information to a memory device of the memory system (e.g., a non-volatile memory device of the memory systems, such as a not—and (NAND) device). In some cases, the information associated with a write command may be stored at a write buffer of the memory system before it is written to the memory device of the memory system. For example, the memory system may store information at a buffer (e.g., a cache) until the stored data in the cache satisfies a size threshold. The memory system may move the information from the buffer to the memory device in response to the satisfied size threshold (e.g., a physical page size). In some examples, the host system may issue a command resulting in a relatively quick flush of data from the buffer to the memory device (e.g., a command associated with a memory management operation, such as a garbage collection procedure, a power off sequence, a cache synchronization operation, a data relocation operation, and the like). In other words, the memory system may be configured to write cached data to the memory device (e.g., regardless of the amount of data stored in the write buffer) for some commands.

In some examples, the memory system may pad the cached data with dummy data until the data satisfies a data size threshold. For example, the memory system may write the cached data (e.g., information stored in the buffer) to the memory device and include a set of dummy data (e.g., append the dummy data to the cached data) such that the size of the combined dummy data and cached data may fill a page corresponding to the memory device. That is, for operations associated with flushing the cached data before the size threshold for a write operation is satisfied, the memory system may add dummy data to satisfy the size threshold and fill a pageline using the cached data and dummy data. However, if the write buffer includes a relatively small amount of data (e.g., compared to the size of the page), writing the set of dummy data to fill the page may reduce efficiency and consume additional storage at the memory device.

Techniques, systems, and devices are described herein for enhancing performance and increasing efficiency by using page line filler data. For example, a memory system may write cached data (e.g., within a write buffer) to a memory device along with a set of data associated with a garbage collection procedure (e.g., valid data from a source block associated with garbage collection operations). In some cases, the combination of the cached data and the set of data may fill a page size (e.g., satisfy a size threshold). As an illustrative example, the memory system may initiate an operation to flush a write buffer (e.g., a memory management operation) into the non-volatile memory device. The memory system may write data from the write buffer to the memory device (e.g., a NAND device) in response to initiating the operation. Depending on the type of operation, the memory system may determine whether to store the data from the write buffer in the memory device using valid garbage collection data or using dummy data. In some examples, the operation (e.g., an enter sleep operation or an enter hibernate operation) may be associated with a relatively long execution time relative to a fast synchronization operation (e.g., a cache synchronization operation, a context switch operation, or any operation associated with a relatively short execution time). In some examples, the memory system may aggregate the write data in the buffer with dummy data to satisfy a size threshold if the operation is a fast synchronization operation. In other examples, the memory system may aggregate the write data with the valid data associated with the garbage collection operation, for example, if the operation is an operation associated with a relatively long execution time.

Additionally or alternatively, the memory system may classify the data in the write buffer. For example, the memory system may classify the data type as write booster data or non-write booster data. The memory system may select a source block within the memory device associated with a garbage collection procedure in response to the classification of the data. In some examples, the memory system may select valid garbage collection data from the source block and may aggregate the valid garbage collection data with the write buffer data. That is, the memory system may write the write buffer data to an open cursor associated with the memory device and may fill the remaining space in the cursor with the garbage collection data. As such, the memory system may write the aggregated data to the memory device to fill a page line, which may reduce a quantity of writes of invalid data, extend a lifetime of the device, improve storage utilization, or any combination thereof.

Figure 2:
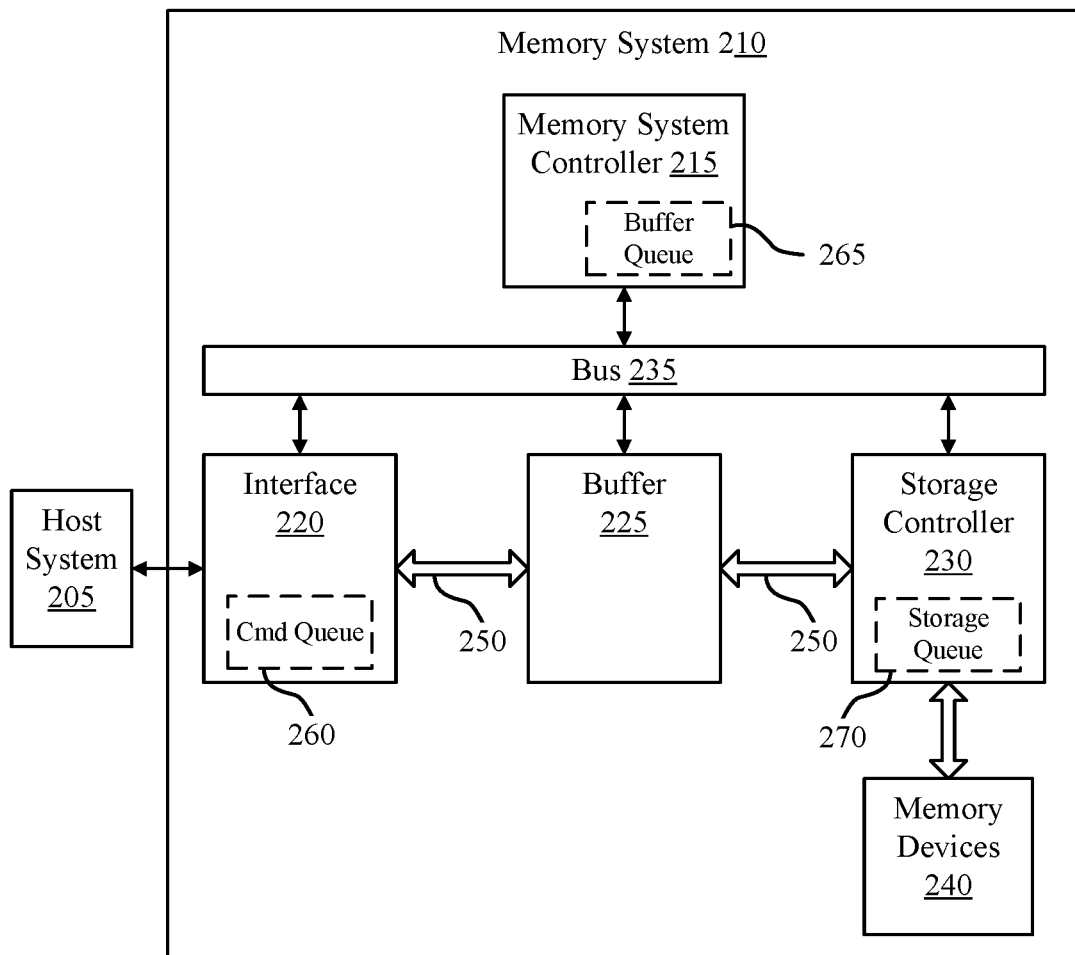
FIG. 2 illustrates an example of a system that supports techniques for page line filler data in accordance with examples as disclosed herein.

Features of the disclosure are initially described in the context of systems, devices, and circuits with reference to FIGS. 1 and 2. Features of the disclosure are described in the context of a process flow and a data scheme with reference to FIGS. 3 and 4. These and other features of the disclosure are further illustrated by and described in the context of an apparatus diagram and a flowchart that relate to techniques for page line filler data with reference to FIGS. 5 and 6.

FIG. 1 illustrates an example of a system 100 that supports techniques for page line filler data in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support techniques for page line filler data. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, the host system 105 may send one or more write commands to the memory system 110 that request the memory system 110 to write information to a memory device 130. In some cases, the information associated with write commands (e.g., data to be stored in a memory device 130) may be stored to a write buffer (e.g., within local memory 120) of memory system 110 at least temporarily. In some examples, the host system 105 may request that the memory system initiate a memory management operation (e.g., a garbage collection procedure, a power off sequence, a cache synchronization operation, a data relocation operation, etc.). In accordance with the memory management operation, the memory system 110 may be configured to write the data stored in the write buffer (e.g., cached data) to the memory device 130 regardless of the amount of data stored in the write buffer. In some examples, the memory system 110 may write the cached data along with a set of dummy data (e.g., random logic states) to the memory device 130, where the combination of the cached data and the set of dummy data may fill a page (e.g., satisfy a size threshold) of the memory device. However, if the write buffer includes a relatively small amount of data (e.g., compared to the size of the page), writing the set of dummy data to fill the page may reduce efficiency and consume additional storage at the memory device 130.

In some examples, in response to a memory management operation, the memory system 110 may write cached data (e.g., within a write buffer) to a memory device 130 along with a set of data associated with a garbage collection procedure (e.g., valid garbage collection data). In some cases, the combination of the cached data and the valid garbage collection data may fill a page size. For example, the memory system 110 may select valid garbage collection data (e.g., valid data in a source block associated with a garbage collection procedure) and may aggregate the valid garbage collection data with the write buffer data. That is, the memory system 110 may write the write buffer data to an open cursor associated with the memory device 130 and may fill the remaining space in the cursor with the garbage collection data. As such, the memory system 110 may write the aggregated data to the memory device 130, enabling the memory system 110 to write cached data to the memory device 130 with less dummy data, which may reduce computing resource use and improve system efficiency, among other benefits.

FIG. 2 illustrates an example of a system 200 that supports techniques for page line filler data in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation). In some examples, the buffer 225 may include a write buffer and may be used for techniques including the use of garbage collection data to fill a page line.

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210. Further, queues may be equivalently referred to as write buffers. Such write buffers may be used for performing the techniques as described with reference to FIG. 3.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on (e.g., in response to) the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, after the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the host system 205 may send write commands to the memory system 210. The information associated with the write commands (e.g., data to be written to the memory system 210) may be submitted to the buffer 225. of the memory system 210. In some examples, the memory system 210 may write cached data (e.g., within the write buffer 225) to a memory device 240 along with a set of data associated with a garbage collection procedure (e.g., valid garbage collection data) where the combination of the cached data and the valid garbage collection data may fill a page size. For example, the memory system 210 may select valid garbage collection data (e.g., valid data in a source block associated with a garbage collection procedure) and may aggregate the valid garbage collection data with the write buffer data. That is, the memory system 210 may write the write buffer data to an open cursor associated with the memory device 240 and may fill the remaining space in the cursor with the garbage collection data. As such, the memory system 210 may write the aggregated data to the memory device 240, enabling the memory system 210 to write cached data to the memory device 240 with relatively less dummy data, which may reduce computing resource use and improve system efficiency, among other benefits.

Figure 3:
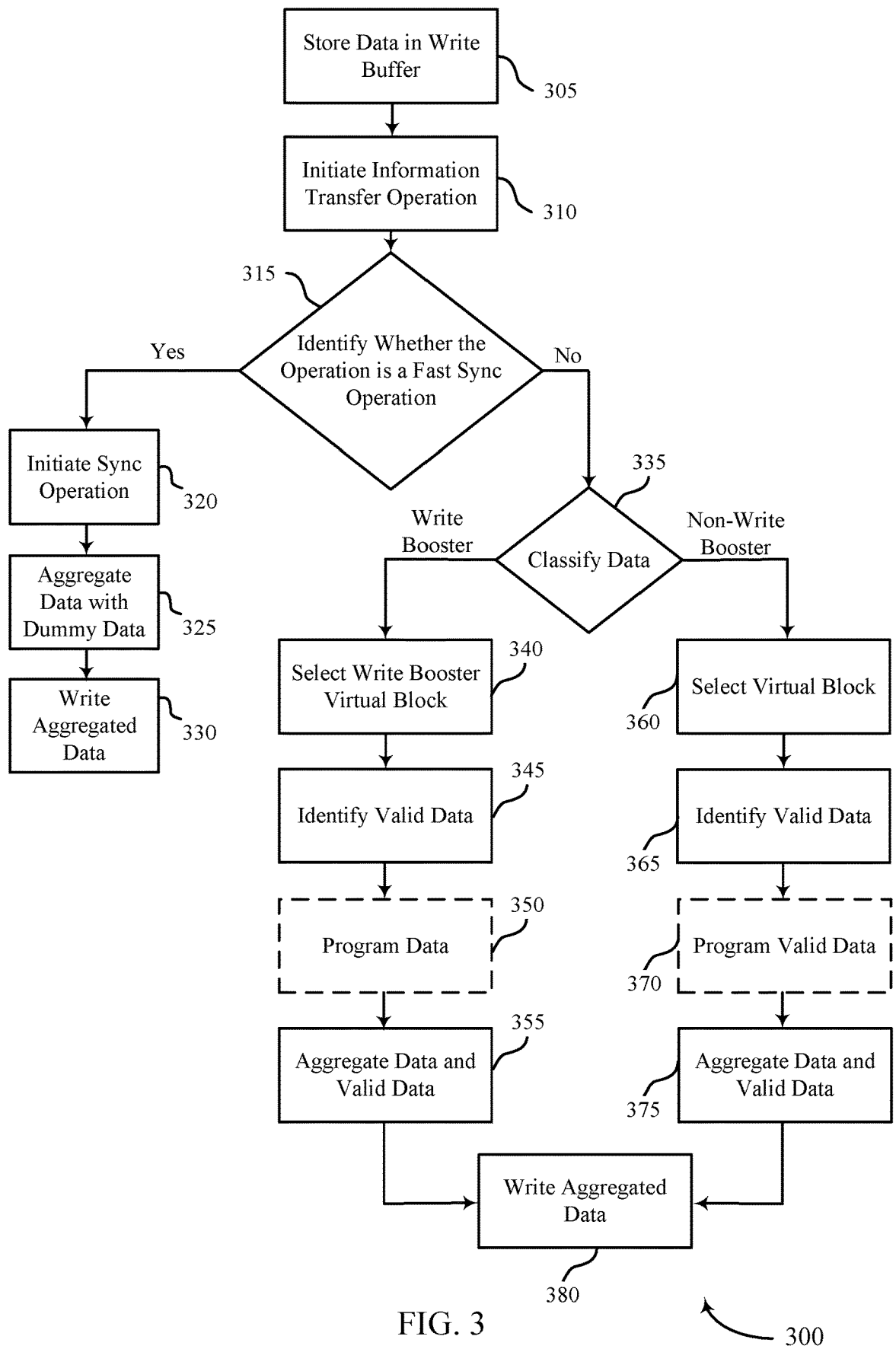
FIG. 3 illustrates an example of a process flow that supports techniques for page line filler data in accordance with examples as disclosed herein.

FIG. 3 illustrates an example of a process flow 300 that supports techniques for page line filler data in accordance with examples as disclosed herein. The operations of process flow 300 may be implemented by a system as described with reference to FIGS. 1 and 2. For example, a memory system, such as memory system 210 or memory system 110, may perform operations associated with the process flow 300 to support aggregating write buffer data with valid data (e.g., valid data associated with a garbage collection operation) to satisfy a data size threshold before writing the aggregated data to a memory device (e.g., a NAND device). Alternative examples of the following may be implemented, where some steps are performed in a different order or not at all. Additionally, some steps may include additional features not mentioned below.

Aspects of the process flow 300 may be implemented by a memory system, a memory device, a controller, among other components (e.g., a memory device controller such as an MNAND die of a memory device). Additionally or alternatively, aspects of the process flow 300 may be implemented as instructions stored in memory (e.g., firmware stored in a memory coupled with the memory device). For example, the instructions, if executed by a controller, may cause the controller to perform the operations of the process flow 300.

At 305, data may be stored in a write buffer. For example, a memory system may receive one or more write commands from a host system. The write commands may indicate first data for the memory system to write to one or more memory devices. In some cases, the memory system may temporarily refrain from writing the first data to a memory device upon receipt of the one or more write commands, for example, due to the data in the write buffer failing to satisfy a data size threshold (e.g., a multiple of a NAND physical page size). That is, the memory system may wait until the write buffer includes enough data to fill a page line of a memory device. For example, the data may be a size sufficient to keep an alignment to a page line (e.g., if the size threshold is satisfied the memory system may program each physical page across NAND planes and dice). As such, the memory system may store the first data associated with the one or more write commands in the write buffer. In some examples, the write buffer may be (or may be within) a local memory of the memory system (e.g., RAM such as an SRAM device). In other examples, the write buffer may be a cache associated with the memory system, for example, in a memory device controller, a memory system controller, or any other cache location.

In some examples, the write buffer may store a quantity of data that satisfies the data size threshold (e.g., a multiple of 16 kB). The data size threshold may depend on the type of memory device associated with the write buffer. For example, the memory device may be associated with a write booster mode. In some such examples, the memory device may be an example of a SLC device (e.g., the memory device may store a single bit of data per memory cell if the write booster mode is enabled). In some examples, the memory device may be an example of a memory device capable of storing multiple bits per memory cell, such as an MLC device, a TLC device, a QLC device, or any other type of device that stores multiple bits per cell. In some examples, the data size threshold may correspond to a multiple of 16 kB (e.g., 64 kB, 768 kB, or the like) which may be a size that fills a page line (e.g., a multiple of a NAND physical page size may be used to flush the data from the write buffer into the memory device in order to keep an alignment and to fill the physical pages of the memory device or mostly fill the physical pages). In some cases, the memory system may write the data from the write buffer to the memory device. That is, in response to the write buffer accumulating a threshold quantity of data, the memory system may flush the data from the write buffer into the memory device.

At 310, an operation to transfer information may be initiated. For example, the memory system may initiate an operation to transfer information stored in the write buffer to a memory device (e.g., a non-volatile memory device) after storing the first data in the write buffer. In other words, initiating the operation may cause the memory system to flush the data from the write buffer into the memory device, regardless of whether the data in the write buffer satisfies a data size threshold. In some examples, the memory system may initiate the operation in response to one or more commands received from a host system. For example, the host system may issue one or more commands forcing the memory system to perform one or more memory management operations at the memory device. Memory management operations may include cache synchronization, context switching, entering a sleep mode, entering a hibernate (H8) mode, or the like. In some examples, the memory system may initiate the operation before the write buffer includes enough data to satisfy the data size threshold. That is, the memory system may initiate the operation while the write buffer stores a quantity of data less than a multiple of a NAND physical page size. As such, the memory system may aggregate data with the data stored in the write buffer such that the amount of data written to the memory device satisfies the data size threshold. In some examples, the memory system may aggregate the write buffer data with dummy data, or other valid data as described herein (e.g., data of a garbage collection source block), or any combination thereof.

At 315, the operation may be identified as either a first data type or a second data type. For example, the memory system may identity whether the operation is a fast synchronization operation (e.g., Fast Sync Cache). In some examples, the memory system may receive a command from the host system requesting the memory system to perform a memory management operation prior to the data in the write buffer satisfying the data size threshold. As such, the memory system may identify whether the memory management operation is a fast synchronization operation or a non-fast synchronization operation. A fast synchronization operation may be a cache synchronization operation (e.g., Fast Sync Cache operation), a context switch operation, a force unit access (FUA) operation, an operation associated with a fast synchronization point, or any operation associated with a relatively short execution time (e.g., as compared to entering a hibernate mode, entering a sleep mode, or the like). Fast synchronization operations may result in the memory system committing data to a non-volatile memory device relatively quickly. In other words, fast synchronization operations may configure a memory system to flush data memory device (e.g., NAND) in a relatively quick (e.g., expedited) manner. Such expedition may be useful in specific scenarios. For example, a power outage may cut power from the memory system and may cause a volatile memory (e.g., SRAM) to lose power and to possible lose that information it is storing. In another example, supply power may waver in time (e.g., due to an unreliable power source). As such, the memory system may commit write buffer memory to the memory device more often and in a relatively short time frame.

In some examples, the memory system may identify the operation to be a fast synchronization operation, and thus, the memory system may flush the write buffer with an expedited process. That is, the memory system may skip utilizing techniques for aggregating the data in the write buffer with page line filler data as described herein. For example, if the operation is a fast sync operation (e.g., a Fast Sync Cache operation), the memory system may skip the garbage collection filler techniques described herein (e.g., in case the memory system flushes the data into NAND as soon as possible based on the fast sync operation).

For example, at 320 a synchronization operation may be initiated. That is, the memory device may initiate a fast synchronization operation in response to identifying the fast synchronization operation at 315. At 325, data may be aggregated with dummy data. That is, the memory system may aggregate the data stored in the write buffer with dummy data such that the aggregated data satisfies the data size threshold. In some cases, the memory system may generate the dummy data as random data (e.g., a set of random logic states). In some cases, the memory system may generate the dummy data as a series of the same logic state (e.g., a set of logic "1's" or a set of logic "0's"). In some examples, generating and writing dummy data may take a relatively short time, for example, to satisfy an execution time corresponding to a fast synchronization operation. In some examples, the memory system may aggregate the data directly in the write buffer. For example, the memory system may write the dummy data in the space remaining in the write buffer (e.g., appending the dummy data to the data previously stored in the write buffer). In some other examples, the memory system may flush the write buffer data to a physical memory device and then write the dummy data to any remaining cells in the page. At 330, aggregated data may be written. For example, after aggregating the data stored in the write buffer with the dummy data, the memory system may write the aggregated data to an address of the memory device.

In some examples, dummy data may not be associated with a valid codeword, or may not include a mapping in an L2P table, among other examples of dummy data. In some examples, a validity mapping associated with the memory system may list the dummy data as invalid data. As dummy data may fail to contain useful information, writing dummy data to the memory device may correspond to a waste of computing resources and inefficient use of the memory device. Further, writing dummy data to the memory device may be associated with an increased physical memory cell saturation to logical memory saturation ratio, leading to a greater cell deterioration and a reduced lifetime of the device. In some examples, programming invalid data to the memory device may result in performing an increased quantity of garbage collection operations (e.g., where data is removed from a portion of the memory device and the associated memory cells are erased). Such examples may result in an increased rate of wear on the memory cells of the memory device. Thus, the techniques described herein may provide for aggregating data from the write buffer with valid data.

In some examples, at 315, the operation may be identified as an operation associated with a relatively long execution time compared to a fast sync operation. For example, the memory system may receive a command from the host system requesting the memory system to perform a memory management operation prior to the data in the write buffer satisfying the data size threshold. That is, the memory system may flush data in the write buffer as part of the memory management operation, and the data in the write buffer may fail to satisfy the data size threshold. In response to the operation not being a fast sync operation, the memory system may flush the write buffer data in addition to valid data. For example, the memory system may aggregate the data in the write buffer with valid data from a source block associated with garbage collection (e.g., garbage collection data).

Garbage collection data may be data read and used from a memory block associated with a garbage collection process. For example, the memory system may perform a garbage collection operation on one or more blocks of the memory device (e.g., blocks storing a quantity of invalid data). As part of the garbage collection procedure, the memory system may parse through a block of the memory device, move valid data out of the block, and program the block to an erased state. In other words, the memory system may erase a memory block and move valid data from the memory block to another location as part of the garbage collection, which may clear the memory block for future storage and eliminate unused or unmapped data (e.g., invalid data) from the system. In some examples, the memory system may read the valid data from the block (e.g., prior to receiving a write command) so that the valid data is available for aggregation with the write buffer data if flushing the write buffer. For example, alternative to (or in addition to) combining the data in the write buffer with dummy data, the memory system may combine the data in the write buffer with valid garbage collection data to satisfy a size threshold (e.g., a multiple of a physical NAND page size). The memory system may select such garbage collection data using a pivot table, mapping the data in the block associated with the garbage collection procedure to the write buffer (or in some cases, an open cursor). Using the pivot table may support consecutive (or sequential) addition of the garbage collection data to the data within the write buffer. For example, the memory system may use a pivot table to collect more consecutive valid data and reduce the quantity of reads for the techniques described herein. Aggregating valid garbage collection data (e.g., consecutive valid garbage collection data) may enable the memory system to reduce the amount of computing resources used by the memory system. For example, valid garbage collection data may be associated with a codeword (or L2P data) and may be easier for the memory system to perform operations on (e.g., reads, writes, or the like) Pivot tables are described in more detail with reference to FIG. 4.

At 335, data may be classified. For example, the memory system may classify the data stored in the write buffer. In some examples, the memory stored in the write buffer may be of a first data type. The first data type may be (or may be associated with) a write booster operation. For example, the memory system may detect that a write booster signal is enabled and that the write data is to be written in a write booster mode. Such data may be referred to as write booster data. Write booster data may be data written in a SLC mode (e.g., the data may be written to a SLC cache or a pseudo SLC cache where each memory cell stores a single bit per cell). In some examples, a source block (e.g., a memory block associated with garbage collection) may depend on the classification of the data stored in the write buffer (e.g., data associated with one or more write commands). For example, if the data is classified as write booster data, the source block for garbage collection may be an SLC virtual block. If the data is classified as other data (e.g., normal data), the source block for garbage collection may be a different virtual block (e.g., an MLC virtual block, TLC virtual block, or QLC virtual block associated with write and read operations that are not in a write booster mode). In some examples, write booster data may be associated with a first size threshold (e.g., 16 kb to fill a page line in SLC mode) and non-write booster data may be associated with a second size threshold (e.g., 48 kb to fill a page line in TLC mode).

At 340, a write booster virtual block (e.g., an SLC virtual block) may be selected. For example, the memory system may select a write booster virtual block as the source block for garbage collection in response to classifying the data in the write buffer as write booster data. In some examples, the memory system may read data from the source block as part of a pre-fetching operation. For example, the memory system may select the source block and read valid data (e.g., pre-fetch the valid data) such that the valid data is available for aggregation with write buffer data prior to flushing the data.

At 345, valid data may be identified. That is, the memory system may identify second data (e.g., valid garbage collection data) in the selected source block. In some cases, the valid garbage collection data may correspond to a virtual block which may previously (or subsequently) be used for write booster operations. That is, the memory system may identify valid garbage collection data in the selected source block, in some cases, at a different time than when the block may be associated (e.g., used for) write booster operations. In some examples, the valid data may be data for relocation prior to erasing the source block as part of garbage collection. The memory system may select the valid garbage collection data in accordance with a pivot table as described herein. Valid garbage collection data selection and pivot tables are described in more detail, for example, with reference to FIG. 4.

In some examples, at 350 data may be programmed. For example, the memory system may program the data stored in the write buffer (data associated with one or more write commands) to an open cursor. In some examples, the memory system may program the data stored in the write buffer to an open cursor based on the data in the write buffer satisfying a threshold. For example, if the data in the write buffer is greater than a pre-defined data size threshold when then memory system controller decides to write (or program) into the memory device, the step of 350 may performed. As an illustrative example, the memory system may program the write buffer data into an open write booster cursor (e.g., an SLC cursor). In some other examples, user data and garbage collection valid data may be aggregated in the write buffer when the data size does not reach (e.g., satisfy) the threshold.

At 355, data may be aggregated with valid data. For example, the memory system may aggregate the first data stored in the write buffer with the second data in the source block (e.g., valid garbage collection data selected at 350) until the aggregated data satisfies the data size threshold. In some examples, the memory system may aggregate the data within the write buffer itself. That is, the memory system may write the valid garbage collection data into the write buffer until the size threshold is satisfied. In some examples, the memory system may write the valid garbage collection data sequentially (e.g., in order of identification from the source block) to the write buffer. In other examples, the memory system may aggregate the write buffer data and the valid garbage collection data in the memory device (e.g., a cursor may be updated to include the write buffer data and the valid data, and the memory system may flush the write buffer to the memory device and relocate the valid data to the target address to fill the target block). In some examples, the memory system may write the garbage collection data into the cursor sequentially.

In some examples, the data stored in the write buffer may be data other than write booster data (i.e., normal data). For example, the memory system may detect that a write booster signal is disabled. As such, at 335, the memory device may classify the data in the write buffer as non-write booster data (i.e., normal data).

At 360, a virtual block may be selected. For example, the memory system may select a normal virtual block (e.g., SLC virtual block, MLC virtual block, TLC virtual block, QLC virtual block, etc.) as a source block for garbage collection in response to classifying the data as non-write booster data. In some examples, the memory system may select the source block in a pre-fetching operation. For example, the memory system may select the source block and read valid data (e.g., pre-fetch the valid data) such that the valid data is available for aggregation with write buffer data prior to flushing the data. The virtual block may be associated with the garbage collection procedure and may correspond to any level cell (e.g., SLC, MLC, TLC, QLC, or the like). For example, the virtual block may be an example of TLC storage where each memory cell stores 3 bits per cell.

At 365, valid data may be identified. That is, the memory system may identify second data (e.g., valid garbage collection data) in the source block. For example, the valid data may be data for relocation prior to erasing the source block as part of garbage collection. The memory system may select the valid garbage collection data in accordance with a pivot table as described herein. Valid garbage collection data selection and pivot tables are described in more detail, for example, with reference to FIG. 4.

In some examples, at 370 data may be programmed. For example, the memory system may program the data stored in the write buffer (data associated with one or more write commands) to an open cursor, such as a TLC cursor for non-write booster operations. In some examples, the memory system may program the data stored in the write buffer to an open cursor based on the data in the write buffer satisfying a threshold. For example, if the data in the write buffer is greater than a pre-defined data size threshold when then memory system controller decides to write (or program) into the memory device, the step of 370 may performed. At 375, data may be aggregated with valid data. For example, the memory system may aggregate the first data stored in the write buffer with the second data in the source block (e.g., valid garbage collection data selected at 370) such that the aggregated data satisfies the data size threshold. In some examples, the memory system may aggregate the data within the write buffer. That is, the memory system may write the valid garbage collection data into the write buffer after the write buffer data. In some examples, the memory system may write the valid garbage collection data sequentially (e.g., in order of identification from the source block) to the write buffer. In other examples, the memory system may aggregate the write buffer data and the valid garbage collection data in the memory device (e.g., a cursor may be updated to include the write buffer data and the valid data, and the memory system may flush the write buffer to the memory device and relocate the valid data to the target address to fill the target block). The cursor may be an SLC cursor, an MLC cursor, a TLC cursor, a QLC cursor, or the like. In some cases, the memory system may write the write buffer data and then write the garbage collection data into the cursor. In some examples, the memory system may write the garbage collection data into the cursor sequentially.

At 380, aggregated data may be written. That is, the memory system may write the aggregated data first data and second data to the memory device. In some examples, writing aggregated data associated with write booster data may include writing a single bit to a single memory cell using a write booster mode of the memory system. That is, the write booster mode of the memory system may configure the memory device to write the aggregated data in a SLC manner (e.g., writing a single bit to a single memory cell). In some other examples, the memory system may operate in a second mode (e.g., a non-write booster mode) and the memory system may write the aggregated data using a different scheme (e.g., three bits per memory cell in a TLC manner).

The techniques described herein may be implemented to realize one or more possible advantages. For example, by using valid data (e.g., garbage collection data, although any example of valid data may be used) rather than dummy data to fill a page line may result in a reduced quantity of extraneous write operations, thereby improving a life of the memory device, improving a memory utilization, or both, among other examples of advantages.

Figure 4:
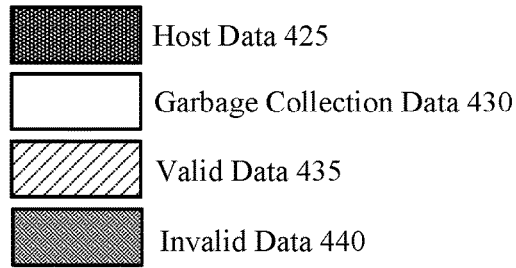
FIG. 4 illustrates an example of a data scheme that supports techniques for page line filler data in accordance with examples as disclosed herein.
Figure 4:
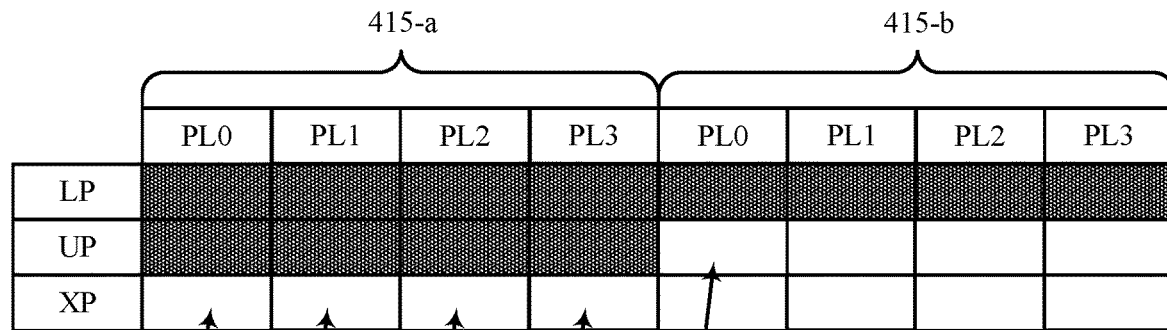
Figure 4:
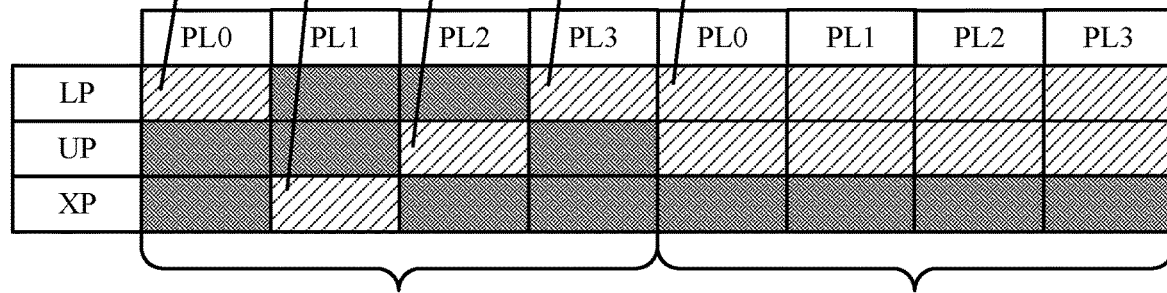

FIG. 4 illustrates an example of a data scheme 400 that supports techniques for page line filler data in accordance with examples as disclosed herein. The data scheme 400 may represent an example of a mapping between a source block 410 (e.g., a virtual garbage collection block) of a memory device and a write buffer 405 associated with writing data to the memory device. The mapping may illustrate an example of writing valid data to the write buffer 405 to satisfy a size threshold as described herein with reference to FIGS. 1-3. The data scheme 400 may be used by systems such as systems 100 and 200, as described with reference to FIGS. 1 and 2. For example, a memory system 210 may use data scheme 400 while performing procedures such as those described in process flow 300 as described with reference to FIG. 3. The data scheme 400 is described with reference to a TLC device, but other data schemes may be used to support any level cell (e.g., SLC, MLC, QLC) or any performance mode (e.g., write booster mode).

The write buffer 405 may be an example of a write buffer as described herein. For example, the write buffer 405 may store first data associated with one or more write commands prior to writing the first data to a memory device. In the example of data scheme 400, the memory system may include two memory devices 415 (e.g., NAND devices), although any quantity of memory devices 415 may be used. A memory device 415 may include a set of planes and pages, which may be examples of the corresponding elements as described with reference to FIG. 1. For example, the memory device 415-*a* may include four planes (PL0, PL1, PL2, PL3) and may be an example of a TLC memory device 415 (e.g., each memory cell may store 3 bits). In such examples, the memory device 415-*a* may include a lower page (LP), an upper page (UP), and an extra page. In some examples, a page line size may be in response to the quantity of devices 415, a storage scheme (e.g., SLC, TLC, etc.), a quantity of memory cells per page, or any combination thereof. For example, a memory system with four devices 415, four planes, and a TLC scheme, may have a page line size of 768 kB (e.g., compared to a SLC scheme with a page line size of 64 kB per NAND die). In some examples, a TLC page line may correspond to 4 NAND dice, though any quantity may be used. In some examples, the write buffer 405 may be an example of RAM in which the memory system temporarily stores write data, and a cursor (e.g., a TLC cursor) may indicate a location in the NAND device that the write data in the buffer is to be written.

In the example illustrated by data scheme 400, the write buffer 405 may include a quantity of host data 425, for example, due to a memory system receiving one or more write commands requesting that the host data 425 be written to a memory device. The host data may be referred to as "first data." As shown, in some examples the quantity of host data 425 may fail to satisfy a data size threshold as described with reference to FIG. 3. For example, the host data 425 may fail to fill a page line of the write buffer 405 for the TLC open cursor. In accordance with the techniques described herein, the memory system may aggregate the host data 425 and garbage collection data 430 into the write buffer 405 for a TLC open cursor (or other examples of cursors) as shown in the data scheme 400.

For example, the memory system may select the source block 410 as described with reference to FIG. 3 (e.g., in response to a data classification). The source block 410 may be selected for garbage collection. For example, the memory system may parse through the source block 410 to identify valid data 435 for relocation to another block. After moving the valid data 435, the memory system may reprogram (e.g., erase) the source block 410 to erase the invalid data 440 while relocating the valid data 435, which may make the source block 410 available for storage of future data.

The memory system may relocate the valid data 435 of the source block 410 to the write buffer 405 as garbage collection data 430 as described herein. For example, the memory system may receive a command to flush the write buffer 405 and the memory system may fill a page line with the garbage collection data 430 in addition or alternative to dummy data. As an illustrative example, the memory system may select the valid data 435 from the source block 410 in a pattern or order (e.g., the memory system may fill the write buffer 405 in a sequential or consecutive manner). For example, in data scheme 400 the memory system may select the data in order of an increasing index (e.g., the data scheme may locate data starting at the PL0 and move through the planes and devices 415-*c* and 415-*d* at the lower page, then move to the upper page and move through the planes of each device 415-*c* and 415-*d*, then move to the extra page and move through the plane of each device 415-*c*, and 415-*d*, etc.), although any order for selecting valid data 435 from the source block 410 may be used. In some examples, the selected valid data 435 to fill the write buffer may be selected in response to being valid data 435 in a pivot table that is associated with a highest consecutive quantity of "1" from the source block 410. Such an example of sequential or consecutive selection may enable the memory system to maintain a sequential order of garbage collection data 430 into the open cursor virtual block. The memory system may read the selected valid data 435 from the source block 410 and may write the valid data 435 to the write buffer 405, in some examples, in the order the valid data 435 was selected. In some examples, a pivot table may be used to relocate the valid data 435. For example, the firmware of the memory system may collect some or all of the valid data 435 from the source block 410 using a pivot table, in order to fill up a pageline (e.g., a 64 kB pageline size).

By implementing data schemes such as the illustrative example of data scheme 400, a memory system may fill a write buffer with valid data identified and selected from a block of the memory device associated with a garbage collection procedure. Doing so may decrease the amount of dummy data written to a memory device (e.g., decreasing the density of invalid data in the memory device), thereby lowering a quantity of garbage collection procedures performed. Further, decreasing the amount of dummy data written to the memory device may lower the damage (or wear) of memory cells, enhancing memory system efficiency, and increasing the lifetime of the memory system, among other benefits.

Figure 5:
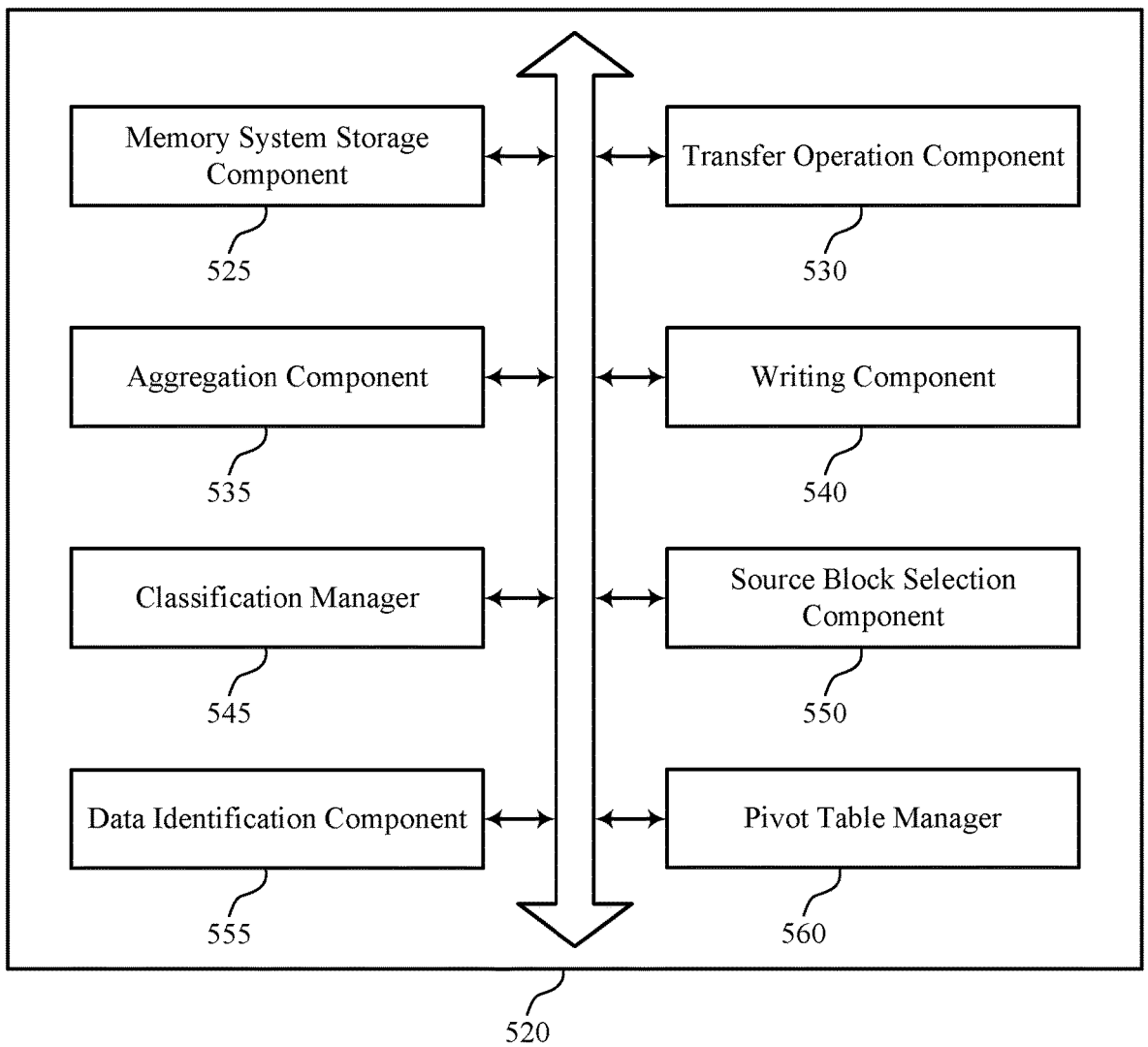
FIG. 5 shows a block diagram of a memory system that supports techniques for page line filler data in accordance with examples as disclosed herein.

FIG. 5 shows a block diagram 500 of a memory system 520 that supports techniques for page line filler data in accordance with examples as disclosed herein. The memory system 520 may be an example of aspects of a memory system as described with reference to FIGS. 1 through 4. The memory system 520, or various components thereof, may be an example of means for performing various aspects of techniques for page line filler data as described herein. For example, the memory system 520 may include a memory system storage component 525, a transfer operation component 530, an aggregation component 535, a writing component 540, a classification manager 545, a source block selection component 550, a data identification component 555, a pivot table manager 560, or any combination thereof. Each of these components may communicate, directly or indirectly, with one another (e.g., via one or more buses).

The memory system storage component 525 may be configured as or otherwise support a means for storing, in a write buffer of the memory system, first data associated with a command from a host system to write the first data to the memory system. The transfer operation component 530 may be configured as or otherwise support a means for initiating an operation to transfer information stored in the write buffer to a non-volatile memory device of the memory system after storing the first data in the write buffer. The aggregation component 535 may be configured as or otherwise support a means for aggregating, based at least in part on (e.g., in response to) initiating the operation, the first data with second data associated with a garbage collection operation of the non-volatile memory device based at least in part on (e.g., due to) the first data having a first size that fails to satisfy a size threshold. The writing component 540 may be configured as or otherwise support a means for writing, to an address of the non-volatile memory device, the aggregated first data and second data based at least in part on (e.g., in response to) initiating the operation, the aggregated first data and second data having a second size that satisfies the size threshold.

In some examples, the classification manager 545 may be configured as or otherwise support a means for classifying the first data as a first data type or a second data type. In some examples, the source block selection component 550 may be configured as or otherwise support a means for selecting a source block associated with the garbage collection operation based at least in part on (e.g., in accordance with) classifying the first data, where aggregating the first data with the second data is based at least in part on (e.g., aided through the use of) the selected source block.

In some examples, the first data is classified as the first data type and the first data type includes write booster data. In some examples, the source block includes a virtual block used for a write booster operation. In some examples, the first data is classified as the second data type and the source block includes a virtual block used for a normal write operation.

In some examples, the data identification component 555 may be configured as or otherwise support a means for identifying the second data from valid data stored in a source block of the non-volatile memory device, where aggregating the first data with the second data is based at least in part on (e.g., in response to) identifying the second data.

In some examples, to support identifying the second data, the pivot table manager 560 may be configured as or otherwise support a means for selecting the valid data based at least in part on (e.g., referencing) a pivot table indicating the valid data in the source block.

In some examples, the writing component 540 may be configured as or otherwise support a means for writing the valid data consecutively into the write buffer, where aggregating the first data and the second data is based at least in part on (e.g., aided through) the writing. In some examples, the writing component 540 may be configured as or otherwise support a means for writing the second data into the write buffer until a size of the first data and the second data satisfies the size threshold. In some examples, to support writing the aggregated first data and second data, the writing component 540 may be configured as or otherwise support a means for writing a single bit to a single memory cell using a write booster mode of the memory system.

In some examples, the memory system storage component 525 may be configured as or otherwise support a means for storing in the write buffer of the memory system, third data associated with a second command from the host system to write the third data to the memory system. In some examples, the transfer operation component 530 may be configured as or otherwise support a means for initiating a second operation to transfer the third data stored in the write buffer to the non-volatile memory device of the memory system, where the second operation includes a sync operation different than the operation, the sync operation associated with a duration shorter than a duration of the operation. In some examples, the writing component 540 may be configured as or otherwise support a means for writing, to a second address of the non-volatile memory device, the third data based at least in part on (e.g., in response to) initiating the operation.

In some examples, the aggregation component 535 may be configured as or otherwise support a means for aggregating the third data with fourth data based at least in part on (e.g., in response to) initiating the operation, where the fourth data includes dummy data and the aggregated third data and fourth data have a size that satisfies the size threshold.

In some examples, the classification manager 545 may be configured as or otherwise support a means for identifying whether the second operation includes a cache sync operation, a context switch operation, or a combination thereof, where initiating the second operation that includes the sync operation associated with the duration shorter than the duration of the operation is based at least in part on (e.g., due to) the identifying.

In some examples, the classification manager 545 may be configured as or otherwise support a means for identifying whether the operation includes a fast sync operation, where aggregating the first data with the second data associated with the garbage collection operation is based at least in part on (e.g., due to) the identifying.

Figure 6:
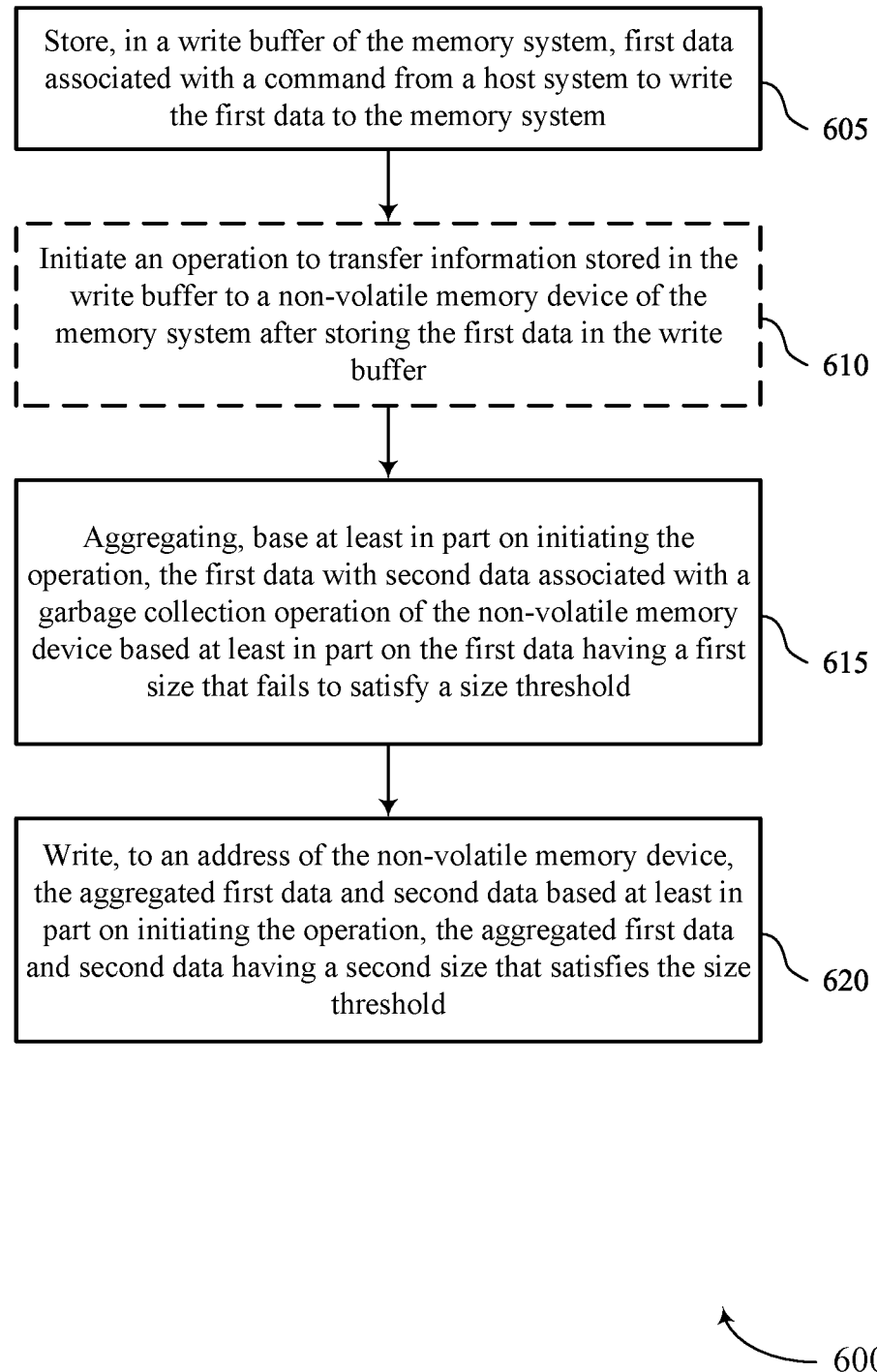
FIG. 6 shows a flowchart illustrating a method or methods that support techniques for page line filler data in accordance with examples as disclosed herein.

FIG. 6 shows a flowchart illustrating a method 600 that supports techniques for page line filler data in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include storing, in a write buffer of the memory system, first data associated with a command from a host system to write the first data to the memory system. The operations of 605 may be performed in accordance with examples as disclosed herein. In some examples, aspects of the operations of 605 may be performed by a memory system storage component 525 as described with reference to FIG. 5.

In some examples, at 610 the method may include initiating an operation to transfer information stored in the write buffer to a non-volatile memory device of the memory system after storing the first data in the write buffer. In some examples, the memory system may program the data stored in the write buffer to an open cursor based on the data in the write buffer satisfying a threshold as described herein. Otherwise, in some examples, the memory system may skip 610 and move to 615. The operations of 610 may be performed in accordance with examples as disclosed herein. In some examples, aspects of the operations of 610 may be performed by a transfer operation component 530 as described with reference to FIG. 5.

At 615, the method may include aggregating, based at least in part on (e.g., in response to) initiating the operation, the first data with second data associated with a garbage collection operation of the non-volatile memory device based at least in part on (e.g., due to) the first data having a first size that fails to satisfy a size threshold. The operations of 615 may be performed in accordance with examples as disclosed herein. In some examples, aspects of the operations of 615 may be performed by an aggregation component 535 as described with reference to FIG. 5.

At 620, the method may include writing, to an address of the non-volatile memory device, the aggregated first data and second data based at least in part on (e.g., in response to) initiating the operation, the aggregated first data and second data having a second size that satisfies the size threshold. The operations of 620 may be performed in accordance with examples as disclosed herein. In some examples, aspects of the operations of 620 may be performed by a writing component 540 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for storing, in a write buffer of the memory system, first data associated with a command from a host system to write the first data to the memory system, initiating an operation to transfer information stored in the write buffer to a non-volatile memory device of the memory system after storing the first data in the write buffer, aggregating, based at least in part on (e.g., in response to) initiating the operation, the first data with second data associated with a garbage collection operation of the non-volatile memory device based at least in part on (e.g., due to) the first data having a first size that fails to satisfy a size threshold, and writing, to an address of the non-volatile memory device, the aggregated first data and second data based at least in part on (e.g., in response to) initiating the operation, the aggregated first data and second data having a second size that satisfies the size threshold.

Some examples of the method 600 and the apparatus described herein may further include operations, features, circuitry, logic, means, or instructions for classifying the first data as a first data type or a second data type and selecting a source block associated with the garbage collection operation based at least in part on (e.g., in accordance with) classifying the first data, where aggregating the first data with the second data may be based at least in part on (e.g., aided through the use of) the selected source block.

In some examples of the method 600 and the apparatus described herein, the first data may be classified as the first data type and the first data type includes write booster data and the source block includes a virtual block used for a write booster operation. In some examples of the method 600 and the apparatus described herein, the first data may be classified as the second data type and the source block includes a virtual block.

Some examples of the method 600 and the apparatus described herein may further include operations, features, circuitry, logic, means, or instructions for identifying the second data from valid data stored in a source block of the non-volatile memory device, where aggregating the first data with the second data may be based at least in part on (e.g., in response to) identifying the second data.

In some examples of the method 600 and the apparatus described herein, identifying the second data may include operations, features, circuitry, logic, means, or instructions for selecting the valid data based at least in part on (e.g., using) a pivot table indicating the valid data in the source block.

In some examples of the method 600 and the apparatus described herein, and the method, apparatuses, and non-transitory computer-readable medium may include further operations, features, circuitry, logic, means, or instructions for writing the valid data consecutively into the write buffer, where aggregating the first data and the second data may be based at least in part on (e.g., in accordance with) the writing. Some examples of the method 600 and the apparatus described herein may further include operations, features, circuitry, logic, means, or instructions for writing the second data into the write buffer until a size of the first data and the second data satisfies the size threshold.

In some examples of the method 600 and the apparatus described herein, writing the aggregated first data and second data may include operations, features, circuitry, logic, means, or instructions for writing a single bit to a single memory cell using a write booster mode of the memory system.

Some examples of the method 600 and the apparatus described herein may further include operations, features, circuitry, logic, means, or instructions for storing in the write buffer of the memory system, third data associated with a second command from the host system to write the third data to the memory system, initiating a second operation to transfer the third data stored in the write buffer to the non-volatile memory device of the memory system, where the second operation includes a sync operation different than the operation, the sync operation associated with a duration shorter than a duration of the operation, and writing, to a second address of the non-volatile memory device, the third data based at least in part on (e.g., in response to) initiating the operation.

Some examples of the method 600 and the apparatus described herein may further include operations, features, circuitry, logic, means, or instructions for aggregating the third data with fourth data based at least in part on (e.g., in response to) initiating the operation, where the fourth data includes dummy data and the aggregated third data and fourth data may have a size that satisfies the size threshold.

Some examples of the method 600 and the apparatus described herein may further include operations, features, circuitry, logic, means, or instructions for identifying whether the second operation includes a cache sync operation, a context switch operation, or a combination thereof, where initiating the second operation that includes the sync operation associated with the duration shorter than the duration of the operation may be based at least in part on (e.g., in response to) the identifying.

Some examples of the method 600 and the apparatus described herein may further include operations, features, circuitry, logic, means, or instructions for identifying whether the operation includes a fast sync operation, where aggregating the first data with the second data associated with the garbage collection operation may be based at least in part on (e.g., in response to) the identifying.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit in response to (e.g., in accordance with) the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a non-volatile memory device; and
    a controller coupled with the non-volatile memory device and configured to cause the apparatus to:
       store, in a write buffer of the apparatus, first data associated with a command from a host system to write the first data to the apparatus;
       initiate an operation to transfer information stored in the write buffer to the non-volatile memory device of the apparatus after storing the first data in the write buffer;
       aggregate, based at least in part on initiating the operation and in response to the first data having a first size that fails to satisfy a size threshold, the first data with second data associated with a garbage collection operation of the non-volatile memory device; and
       write, to an address of the non-volatile memory device, the aggregated first data and second data based at least in part on initiating the operation, the aggregated first data and second data having a second size that satisfies the size threshold.

2. The apparatus of claim 1, wherein the controller is further configured to cause the apparatus to:
    classify the first data as a first data type or a second data type; and
    select a source block associated with the garbage collection operation based at least in part on classifying the first data, wherein aggregating the first data with the second data is based at least in part on the selected source block.

3. The apparatus of claim 2, wherein the first data is classified as the first data type and the first data type comprises write booster data and the source block comprises a virtual block used for write booster operation.

4. The apparatus of claim 2, wherein the first data is classified as the second data type and the source block comprises a virtual block used for a normal write operation.

5. The apparatus of claim 1, wherein the controller is further configured to cause the apparatus to:
    identify the second data from valid data stored in a source block of the non-volatile memory device, wherein aggregating the first data with the second data is based at least in part on identifying the second data.

6. The apparatus of claim 5, wherein identifying the second data is configured to cause the apparatus to:
    select the valid data based at least in part on a pivot table indicating the valid data in the source block.

7. The apparatus of claim 6, wherein the controller is further configured to cause the apparatus to:
    write the valid data consecutively into the write buffer, wherein aggregating the first data and the second data is based at least in part on the writing.

8. The apparatus of claim 5, wherein the controller is further configured to cause the apparatus to:
    write the second data into the write buffer until a size of the first data and the second data satisfies the size threshold.

9. The apparatus of claim 1, wherein the controller is further configured to cause the apparatus to:
    store, in the write buffer of the apparatus, third data associated with a second command from the host system to write the third data to the apparatus;
    initiate a second operation to transfer the third data stored in the write buffer to the non-volatile memory device of the apparatus, wherein the second operation comprises a sync operation different than the operation, the sync operation associated with a first duration shorter than a second duration of the operation; and
    write, to a second address of the non-volatile memory device, the third data based at least in part on initiating the operation.

10. The apparatus of claim 9, wherein the controller is further configured to cause the apparatus to:
    aggregate the third data with fourth data based at least in part on initiating the operation, wherein the fourth data comprises dummy data and the aggregated third data and fourth data have a size that satisfies the size threshold.

11. The apparatus of claim 9, wherein the controller is further configured to cause the apparatus to:
    identify whether the second operation comprises a cache sync operation, a context switch operation, or a combination thereof, wherein initiating the second operation that comprises the sync operation associated with the first duration that is shorter than the second duration of the operation is based at least in part on the identifying.

12. The apparatus of claim 1, wherein the controller is further configured to cause the apparatus to:
identify whether the operation comprises a fast sync operation, wherein aggregating the first data with the second data associated with the garbage collection operation is based at least in part on the identifying.

13. A non-transitory computer-readable medium storing code comprising instructions which, when executed by a processor of an electronic device, cause the electronic device to:
store, in a write buffer of a memory system, first data associated with a command from a host system to write the first data to the memory system;
initiate an operation to transfer information stored in the write buffer to a non-volatile memory device of the memory system after storing the first data in the write buffer;
aggregate, based at least in part on initiating the operation and in response to the first data having a first size that fails to satisfy a size threshold, the first data with second data associated with a garbage collection operation of the non-volatile memory device; and
write, to an address of the non-volatile memory device, the aggregated first data and second data based at least in part on initiating the operation, the aggregated first data and second data having a second size that satisfies the size threshold.

14. The non-transitory computer-readable medium of claim 13, wherein the instructions, when executed by the processor of the electronic device, further cause the electronic device to:
classify the first data as a first data type or a second data type; and
select a source block associated with the garbage collection operation based at least in part on classifying the first data, wherein aggregating the first data with the second data is based at least in part on the selected source block.

15. The non-transitory computer-readable medium of claim 14, wherein:
the first data is classified as the first data type and the first data type comprises write booster data, and
the source block comprises a virtual block used for a write booster operation.

16. The non-transitory computer-readable medium of claim 14,
wherein the first data is classified as the second data type and the source block comprises a virtual block used for a normal write operation.

17. The non-transitory computer-readable medium of claim 13, wherein the instructions, when executed by the processor of the electronic device, further cause the electronic device to:
identify the second data from valid data stored in a source block of the non-volatile memory device, wherein aggregating the first data with the second data is based at least in part on identifying the second data.

18. The non-transitory computer-readable medium of claim 17, wherein the instructions, when executed by the processor of the electronic device, further cause the electronic device to:
write the second data into the write buffer until a size of the first data and the second data satisfies the size threshold.

19. The non-transitory computer-readable medium of claim 13, wherein the instructions, when executed by the processor of the electronic device, further cause the electronic device to:
store, in the write buffer of the memory system, third data associated with a second command from the host system to write the third data to the memory system;
initiate a second operation to transfer the third data stored in the write buffer to the non-volatile memory device of the memory system, wherein the second operation comprises a sync operation different than the operation, the sync operation associated with a first duration shorter than a second duration of the operation; and
write, to a second address of the non-volatile memory device, the third data based at least in part on initiating the operation.

20. The non-transitory computer-readable medium of claim 19, wherein the instructions, when executed by the processor of the electronic device, further cause the electronic device to:
aggregate the third data with fourth data based at least in part on initiating the operation, wherein the fourth data comprises dummy data and the aggregated third data and fourth data have a size that satisfies the size threshold.

21. The non-transitory computer-readable medium of claim 19, wherein the instructions, when executed by the processor of the electronic device, further cause the electronic device to:
identify whether the second operation comprises a cache sync operation, a context switch operation, or a combination thereof, wherein initiating the second operation that comprises the sync operation associated with the first duration that is shorter than the second duration of the operation is based at least in part on the identifying.

22. The non-transitory computer-readable medium of claim 13, wherein the instructions, when executed by the processor of the electronic device, further cause the electronic device to:
identify whether the operation comprises a fast sync operation, wherein aggregating the first data with the second data associated with the garbage collection operation is based at least in part on the identifying.

23. A method performed by a memory system, comprising:
storing, in a write buffer of the memory system, first data associated with a command from a host system to write the first data to the memory system;
initiating an operation to transfer information stored in the write buffer to a non-volatile memory device of the memory system after storing the first data in the write buffer;
aggregating, based at least in part on initiating the operation and in response to the first data having a first size that fails to satisfy a size threshold, the first data with second data associated with a garbage collection operation of the non-volatile memory device; and
writing, to an address of the non-volatile memory device, the aggregated first data and second data based at least in part on initiating the operation, the aggregated first data and second data having a second size that satisfies the size threshold.

24. The method of claim 23, further comprising:
classifying the first data as a first data type or a second data type; and selecting a source block associated with the garbage collection operation based at least in part on classifying the first data, wherein aggregating the first data with the second data is based at least in part on the selected source block.

25. The method of claim 24, wherein the first data is classified as the first data type and the first data type comprises write booster data, and wherein the source block comprises a virtual block used for a write booster operation.

* * * * *